1

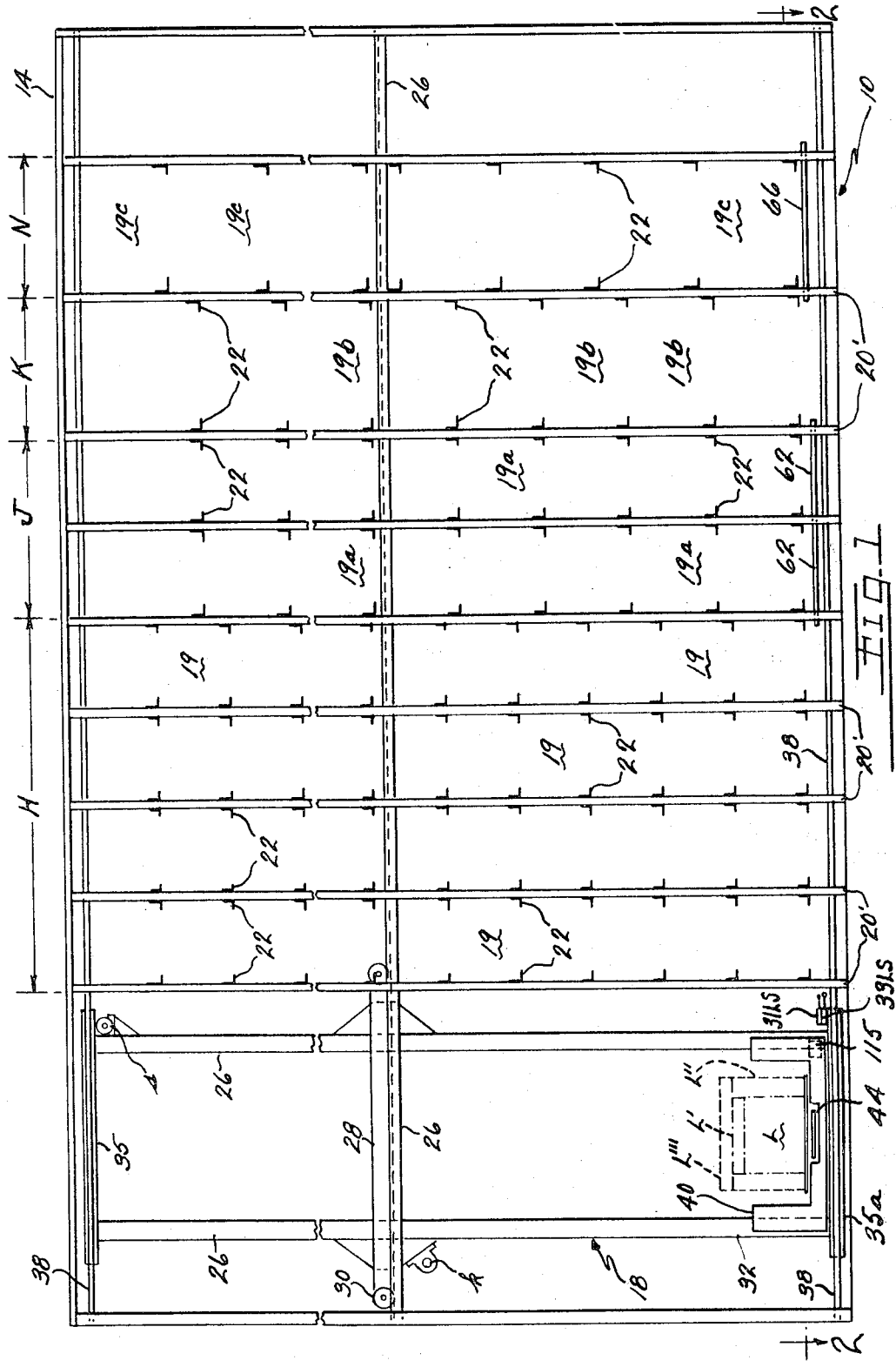

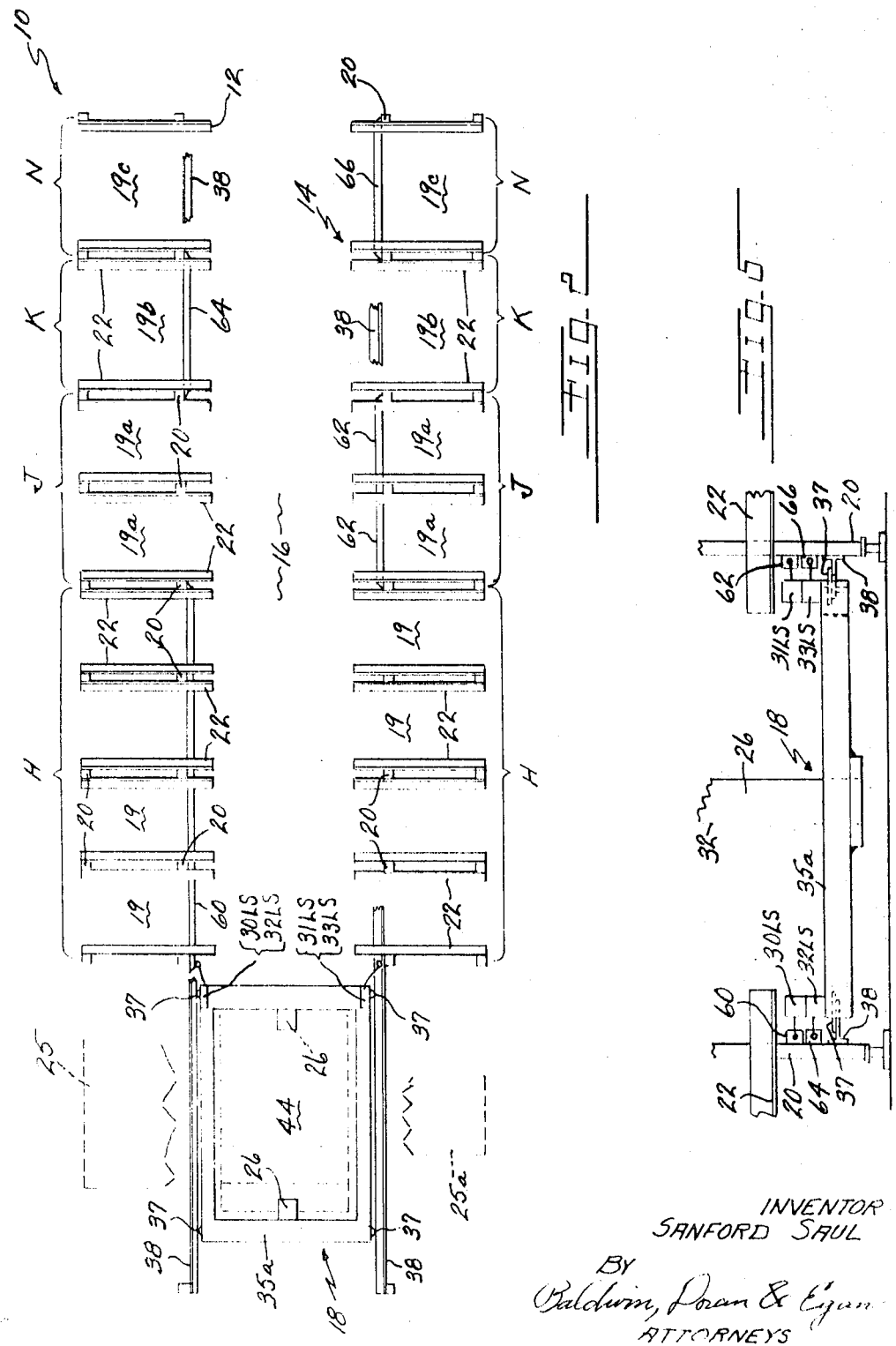

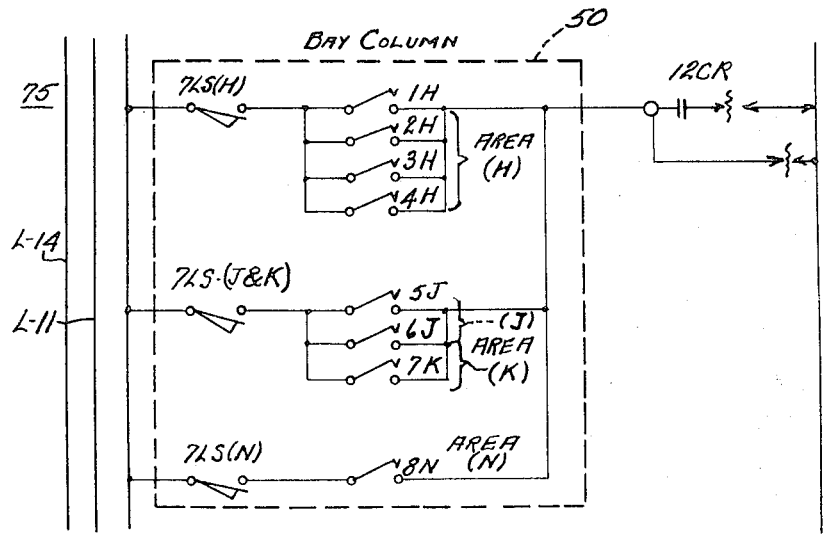
Fig. 6
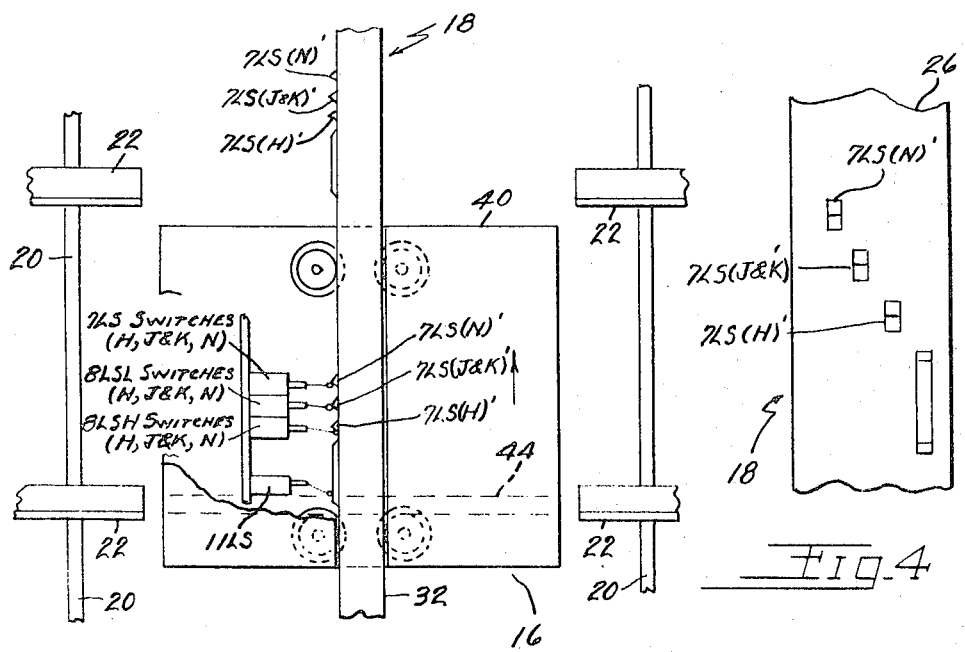
Fig. 5
Fig. 4
INVENTOR
SANFORD SAUL
BY
Baldwin, Doran & Egan
ATTORNEYS INVENTOR
SANFORD SAUL
BY
Baldwin, Doran & Egan
ATTORNEYS United States Patent Office 3,455,468
Patented July 15, 1969

3,455,468
AUTOMATIC WAREHOUSE CONTROL FOR STORING LOADS OF VARYING SIZE
Sanford Saul, Cleveland, Ohio, assignor to The Triax Company, Cleveland, Ohio, a corporation of Ohio
Continuation-in-part of application Ser. No. 533,586, Mar. 11, 1966. This application July 25, 1966, Ser. No. 567,506
Int. Cl. E04h *14/00, 5/00*
U.S. Cl. 214—16.4                    15 Claims

ABSTRACT OF THE DISCLOSURE

This invention relates to automatic warehousing systems for storing or unstoring loads by transferring them between a movable load carrier and a storage frame or bay, and more particularly relates to a warehousing system wherein the storage frame or bay comprises columns of stocked storage means or bins, with the storage frame having areas formed of different sizes of storage bins for receiving a corresponding size of load therein, and wherein means is provided in the load carrier control circuit for selecting the desired area of the storage frame to which the load carrier will travel upon actuation thereof.

---

This is a continuation-in-part application of the copending United States patent application of Sanford Saul, filed Mar. 11, 1966, under Ser. No. 533,586, and entitled Automatic Warehouse Control for Storing Loads of Varying Size, now abandoned.

This invention relates to automatic warehousing systems for storing or unstoring loads by transferring them between a movable load carrier and a storage frame or bay, and more particularly relates to a warehousing system wherein the storage frame or bay comprises columns of stacked storage means or bins, with the storage frame having areas formed of different sizes of storage bins for receiving a corresponding size of load therein, and wherein means is provided in the load carrier control circuit for selecting the desired area of the storage frame to which the load carrier will travel upon actuation thereof.

The present system is particularly adapted for use in connection with the need wherein various sizes of loads are adapted to be handled by the warehousing system, and for instance wherein a certain size or sizes of loads require higher in-and-out storage activity than other load sizes handled by the system, and in the interests of providing a more economic system and of saving space, it becomes desirable to provide in the storage frame different sizes of storage means or bins for receiving a corresponding size of load for storing therein.

In the copending United States patent application Ser. No. 418,048, filed Dec. 14, 1964, by Sanford Saul, now U.S. Patent No. 3,402,835, and entitled Electrical Control Circuit for an Automatic Warehousing System, there is disclosed an automatic warehousing system and control circuitry therefor of the general type with which the present arrangement is adapted for use. However, in such system of the aforementioned copending patent application, the storage frames or bays are comprised of storage bins of generally one size for receiving a standard size of load supporting pallet therein, irrespective of the size of the load supported on the pallet.

The present invention provides a storage frame or bay wherein the load support means or storage bins of the storage frame or bay are of various sizes, with each of the bin sizes being grouped in a particular area or areas of the storage frame, and with there being control circuitry provided for embodying in the control system of the above mentioned pending U.S. patent application,

2 which will enable the warehousing operator to program the system for movement of the load carrier to the selected area of the storage bin wherein the load support means or storage bins are of a size corresponding to the size of the load which is being handled by the load carrier for deposit or removal from the storage frame.

The present invention also provides protection for the system to prevent the possibility of operator error in programing wherein an operator may inadvertently attempt to place a wide load in a narrow bin opening.

Accordingly, it is an object of the present invention to provide a novel automatic warehousing system.

Another object of the invention is to provide a novel automatic warehousing system which includes a storage bay and a powered load carrier movable in a travel zone alongside of the storage bay for inserting a load into or removing a load from the storage bay, and wherein the storage bay comprises columns of stacked storage means such as storage bins, with there being at least one storage area in the storage bay comprised of storage bins of a different size as compared to the size of the storage bins in the remainder of the storage area of the storage bay.

Another object of the invention is to provide an automatic warehousing system of the above described type including control means in the control circuit of the system for selecting the area of the storage bay to which the load carrier will move upon actuation thereof, so that the size of the load on the load carrier can be selectively matched with the selected storage area.

A further object of the invention is to provide an automatic warehousing system of the above type where at least one of the storage areas of the storage bay is adapted to store loads requiring a relatively higher in-and-out storage activity than the other areas of said storage bay, and with said higher activity storage area being disposed closest to the starting position of the load carrier.

A further object of the invention is to provide a novel automatic warehousing system for handling various sizes of loads into and from at least one storage bay with the latter defining columns of stacked storage means or bins, with the storage bay comprising at least one storage area wherein said columns are comprised of storage means of a different size for receiving therein a corresponding size of load, as compared to the size of the storage means in the remainder of the storage area of said storage bay, with the system including a powered load carrier movable in a travel zone alongside the storage bay and adapted for movement through a load handling cycle for delivering a load to and/or returning a load from the storage bay, and with there being power means for actuating the load carrier, and circuit means connected to the power means, and wherein said circuit means includes means for selecting the area of the storage bay to which the load carrier will move upon actuation thereof.

A still further object of the invention is to provide an auomatic warehousing system of the above type which includes a safety checking circuit including means to assure that the load carrier motions are within the programmed areas only, or in other words, in the correct column and at the correct bin level in such column of the selected stoage area.

Another object of the invention is to provide an automatic warehousing system of the aforementioned type which includes means for preventing operator programing error of attempting to store a wide load in a narrower width of storage bin.

A further object of the invention is to provide a warehousing system of the latter type wherein the means for preventing operator error includes means for sensing the width of a load on the load carrier and if such sensing means indicates that the load is too wide for the width of the storage bin in the selected storage area, the load carrier is automatically prevented from attempting to store the oversized load in the selected storage area of the storage frame.

Other objects and advantages of the invention will be apparent from the following description taken in conjunction with the accompanying drawings wherein:

FIGURE 1 is a broken generally diagrammatic side elevational view of a storage frame comprising a plurality of various sizes of stacked storage bins disposed in columns, and showing a powered load carrier associated therewith at one end thereof, preparatory to movement into the travel zone alongside the storage frame;

FIGURE 2 is a sectional view taken generally along the plane of line 2—2 of FIGURE 1 looking in the direction of the arrows, and particularly illustrating switch means providing the aforementioned safety check, to assure that the load carrier motions are within the programmed areas of the storage frame;

FIGURE 3 is an enlarged fragmentary end elevational view of the load carrier showing the location thereon of various sensor means (i.e., switches) and associated actuating cams for controlling the movement of the load carrier to the proper level in the programmed area of the storage frame;

Figure 7:
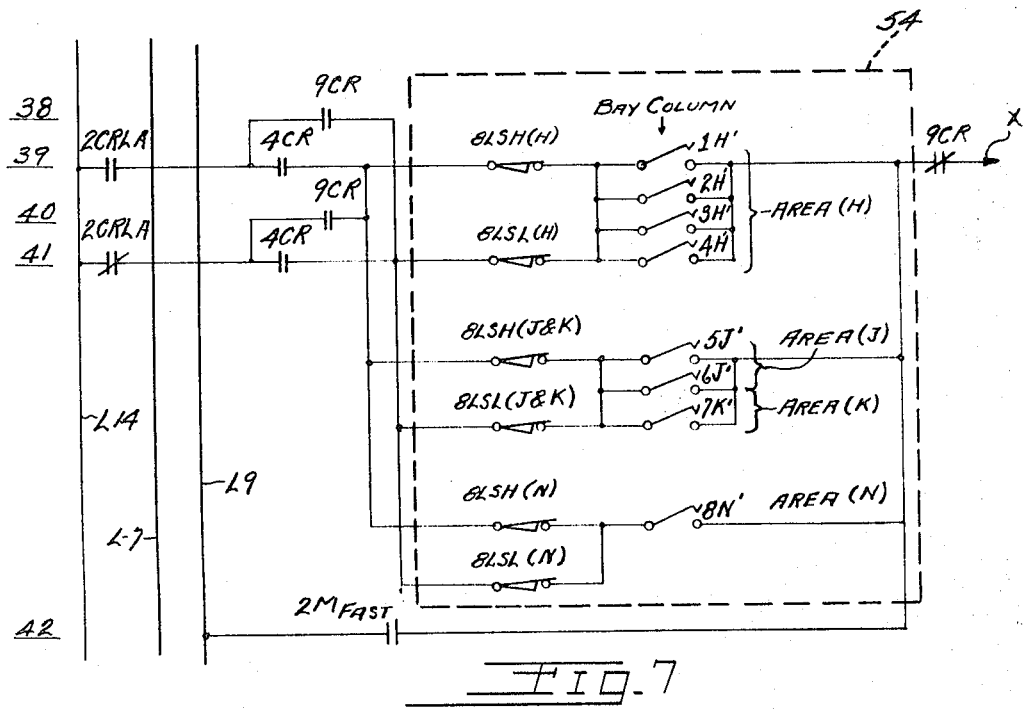
Figure 8:
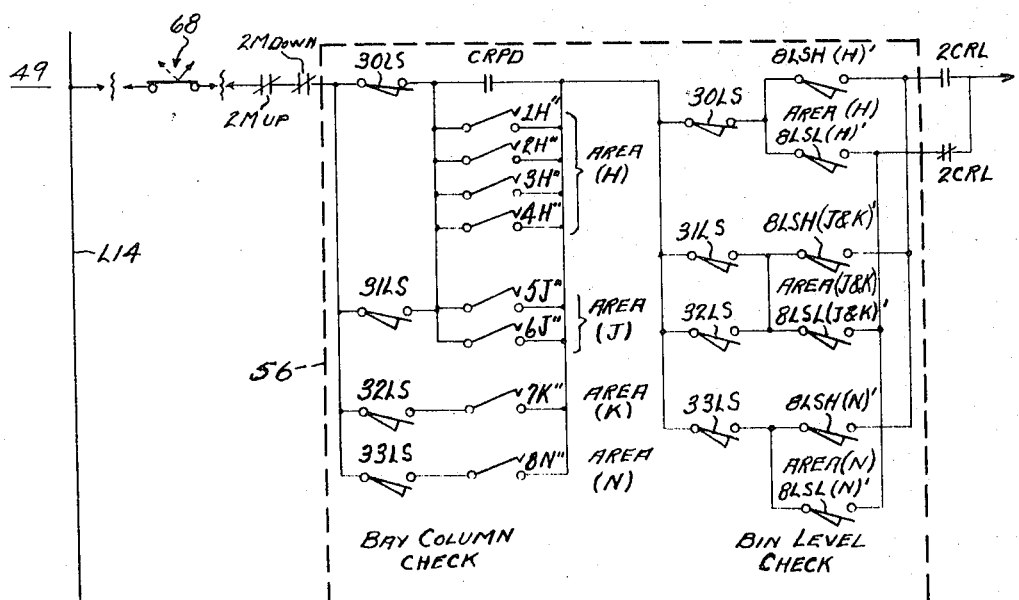
Figure 9:
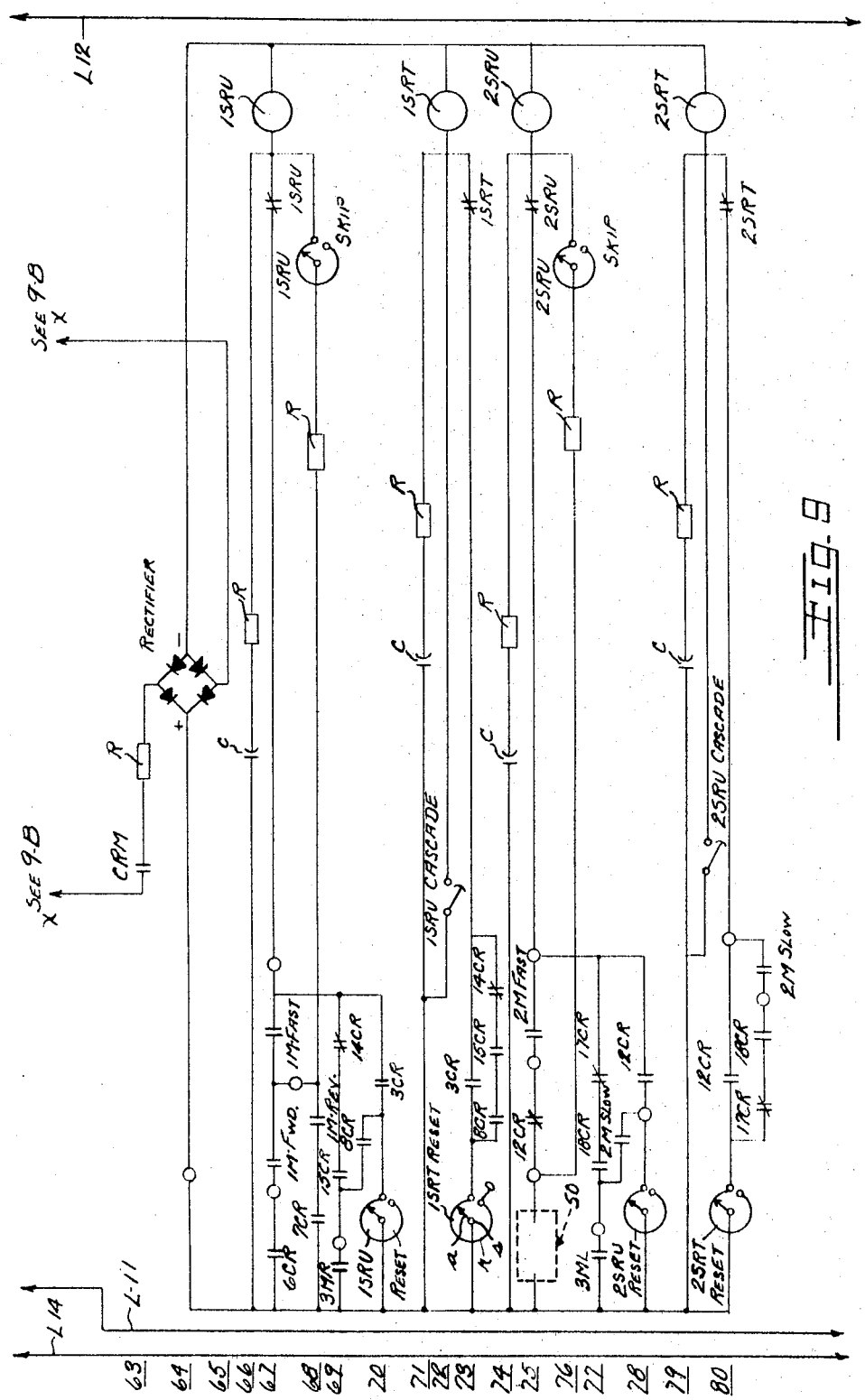
Figure 10:
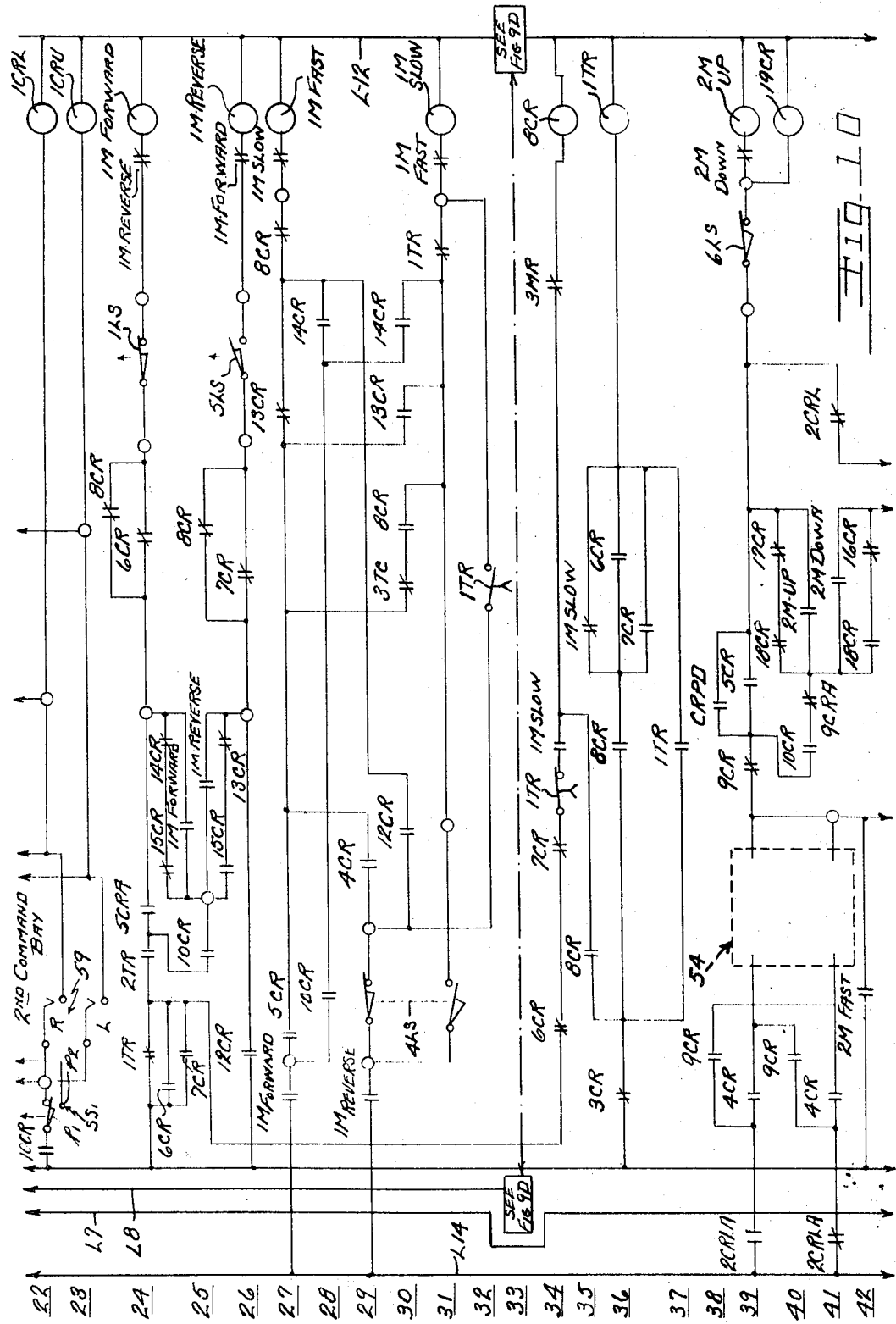
Figure 11:
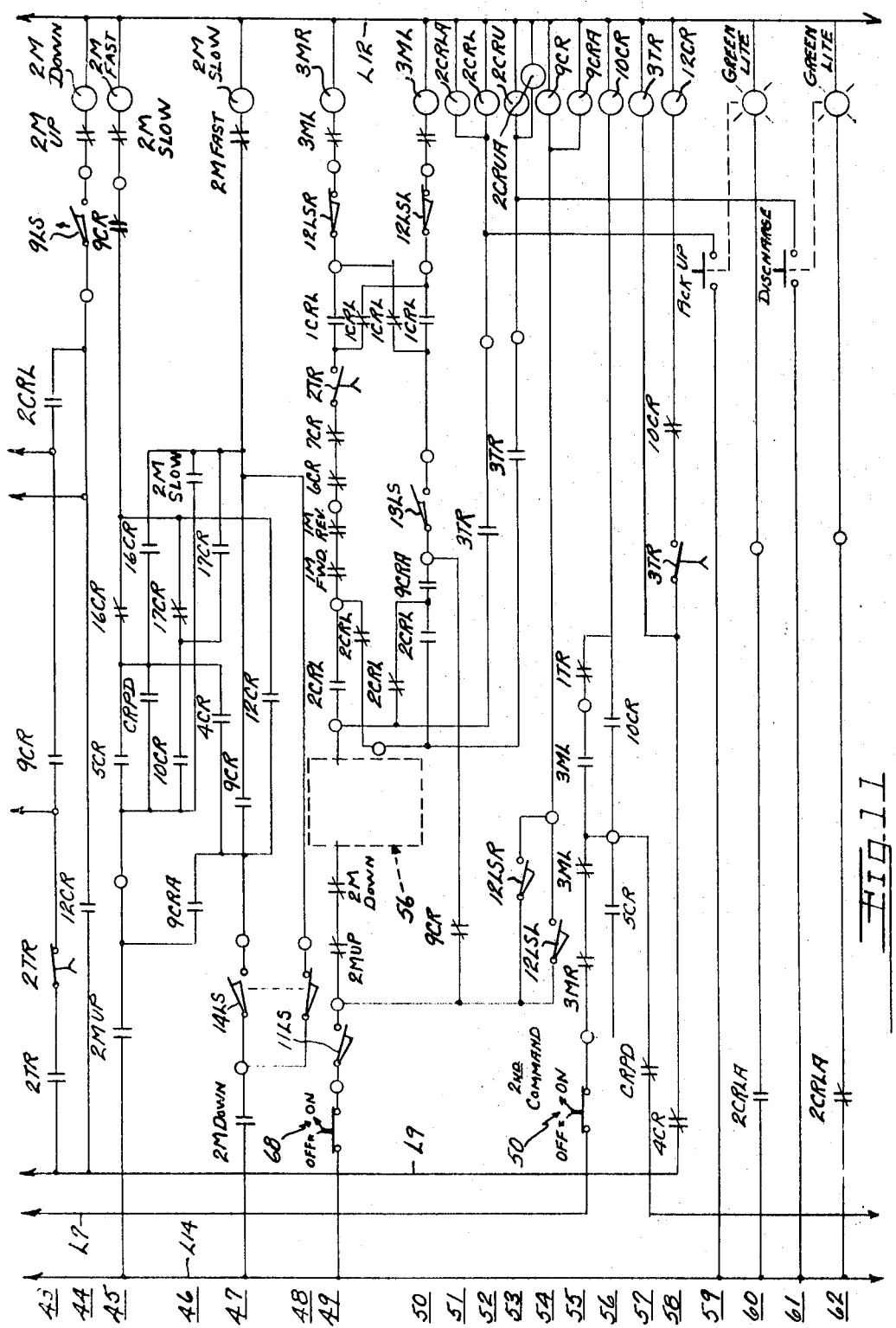
Figure 12:
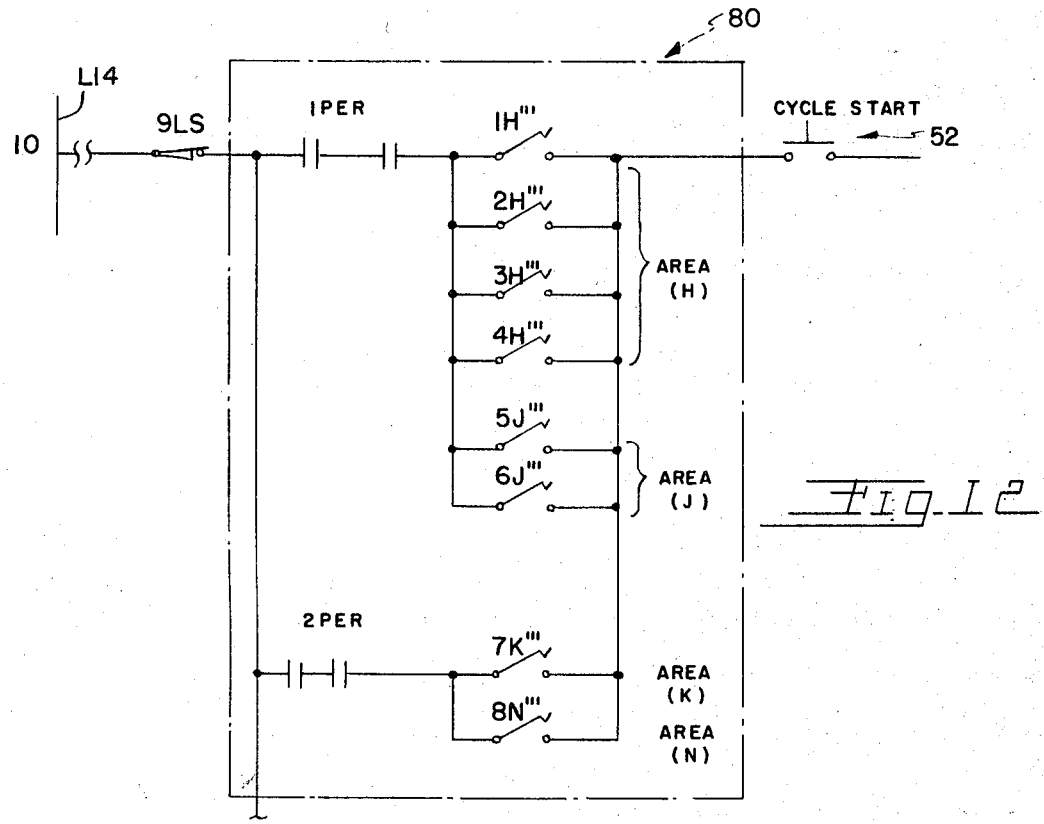
Figure 13:
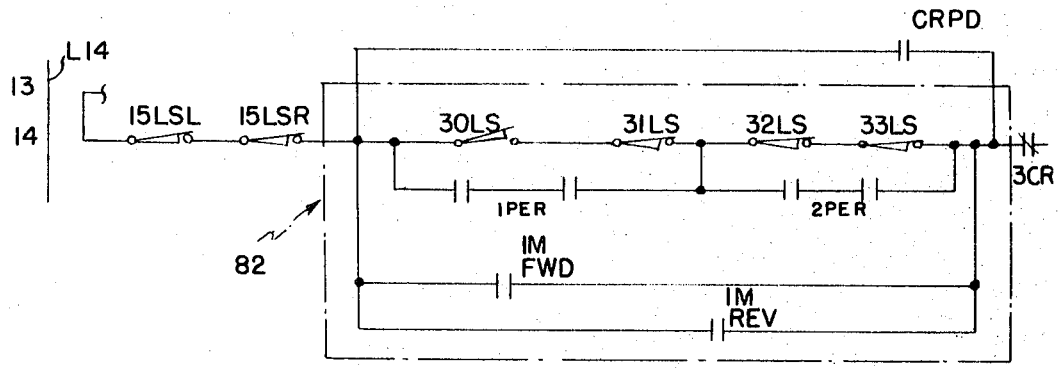
Figure 14:
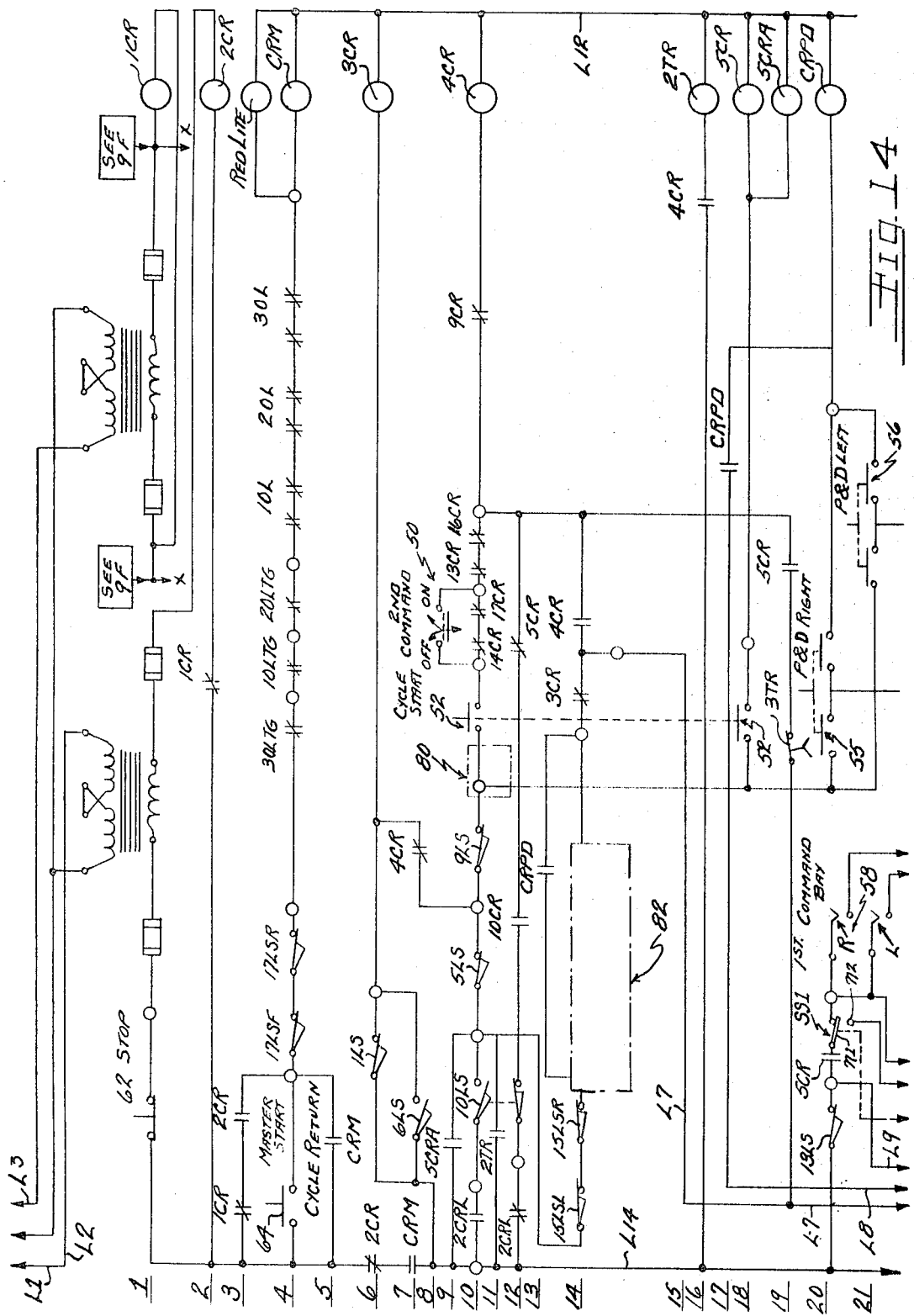
Figure 15:
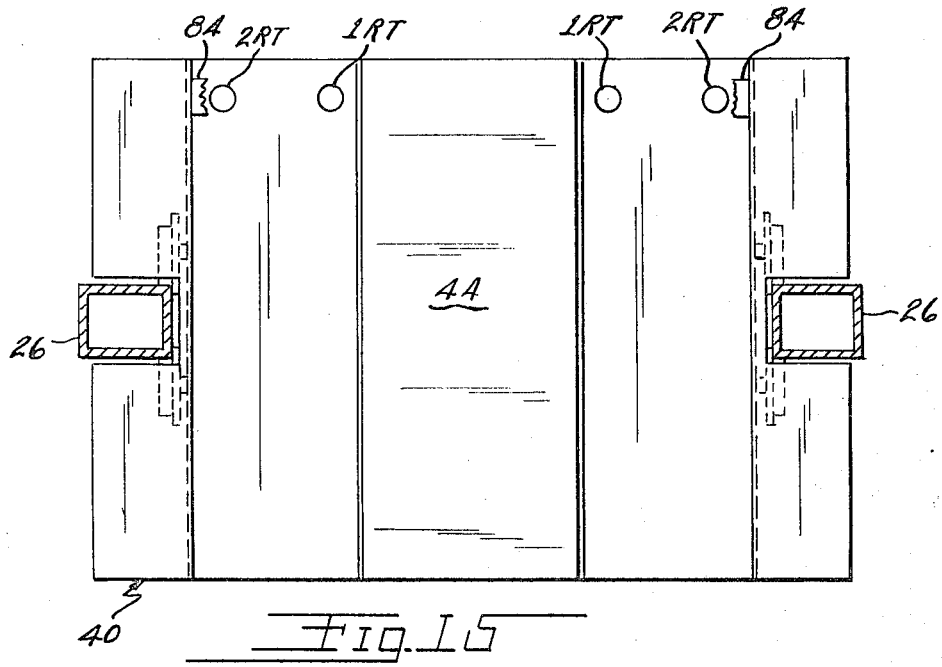
Figure 16:
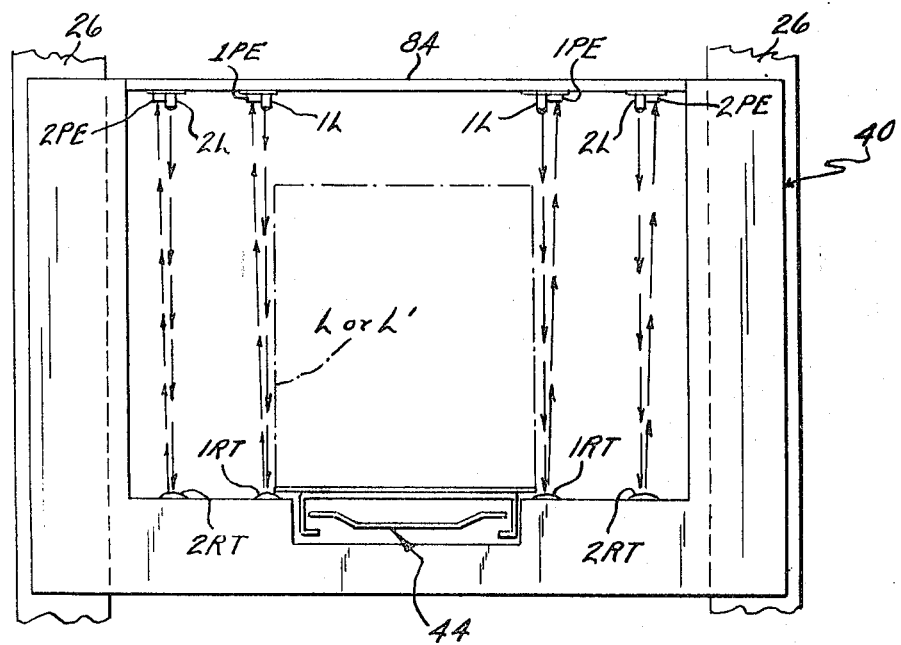

FIGURE 4 is an enlarged fragmentary side elevational view of a portion of the mast of the load carrier showing the sensor actuating cams of FIGURE 3 mounted thereon and representing the cam orientation at each bin level, so that the sensor means for the selected storage area will be actuated at the proper time to properly position the elevator of the load carrier at the selected storage bin in the selected storage area, for permitting a load to be removed from or deposited into said bin;

FIGURE 5 is an enlarged fragmentary end elevational view of the load carrier and showing the switch means of FIGURE 2 associated therewith for providing said safety check to assure that the load carrier will operate within the program areas only of the storage frame, upon actuation thereof;

FIGURE 6 is a diagrammatic fragmentary illustration of a circuit including switch means for selecting which of the vertical counting sensing means (i.e., limit switches) of the control circuit for the load carrier, will be operative in the selected programmed area of the storage frame, during vertical movement of the load carrier with respect to the storage frame, for either depositing a load into or removing a load from the storage frame;

FIGURE 7 is a diagrammatic fragmentary illustration of a circuit including switch means for selecting which of the bin level sensing means (i.e., limit switches) for locating the load carrier at the desired load level location, will be operative in the selected programmed area of the storage frame;

FIGURE 8 is a diagrammatic fragmentary illustration of a circuit providing the aforementioned safety check to assure that the load carrier motions are within the programmed areas only of the storage frame for both column and bin level location;

FIGURE 9 is a fragmentary diagrammatic illustration of a portion of the control circuit of the automatic warehousing system, which is adapted to control the movement of the load carrier for depositing a load into and/or removing a load from the storage frame, and which is generally identical to FIGURE 9F of the circuitry of aforementioned U.S. Patent application Serial No. 418,048, and illustrates in line 75 thereof with a phantom lined rectangle the position wherein the FIGURE 6 circuitry is inserted therein;

FIGURE 10 is a fragmentary diagrammatic illustration of a portion of the control circuitry of U.S. application Ser. No. 418,048, and more particularly FIGURE 9C of said application 418,048, but showing with a phantomed lined rectangle the location in such circuit (i.e., lines 39–41 thereof) wherein the circuitry illustrated in FIGURE 7 is inserted therein;

FIGURE 11 is a fragmentary diagrammatic illustration of a portion of the circuitry of U.S. application Ser. No. 418,048 and more particularly FIGURE 9E of said application 418,048, but showing with a phantomed lined rectangle in lines 49 through 50 thereof where the circuitry of FIGURE 8 is inserted therein;

FIGURE 12 is a diagrammatic, fragmentary illustration of a circuit including sensing means, for sensing the width of a load on the load carrier, and if such width is greater than the width of the storage bins in the selected programmed storage area of the storage frame, such sensing means will interrupt the load carrier operating cycle and thus prevent the load carrier from attempting to insert the oversized load in the programmed storage area;

FIGURE 13 is a diagrammatic, fragmentary illustration of a circuit including sensing means for instituting the return of the load carrier to a beginning position if the load on the load carrier is oversized for the width of the storage bins in the selected programmed area of the storage frame, at the final destination of the load carrier in the storage frame;

FIGURE 14 is a fragmentary diagrammatic illustration of a portion of the control circuit of the automatic warehousing system, which is adapted to control the movement of the load carrier for depositing a load into and/ or removing a load from the storage frame, and which is generally identical to FIGURE 9B of the circuitry of aforementioned U.S. patent application Ser. No. 418,048, and illustrates in lines 10 and 14 thereof with phantomed lined rectangles, the positions wherein the FIGURES 12 and 13 circuitry are respectively inserted therein;

FIGURE 15 is a generally diagrammatic, horizontally sectioned enlarged plan view of the elevator and associated extractor of the load carrier, and illustrating in particular portions of the sensing means on the elevator for detecting the width of the load being handled by the load carrier; and FIGURE 16 is a side elevational view of the elevator and associated extractor of FIGURE 15 illustrating in particular other portions of the sensing means for detecting load width.

Referring now again to the drawings and in particular to FIGURES 1 and 2 thereof, the automatic warehousing system may comprise a storage frame 10 having generally parallel storage bay sections 12 and 14 (FIGURE 2) defining between them an aisle or travel zone 16, so as to permit a motorized load carrier, indicated generally at 18, to be moved along the aisle or travel zone 16, and to insert and/or withdraw a load from the load support means or storage bins 19, 19a, 19b and 19c formed by the storage bays 12 and 14.

As shown, each storage bay may be constructed of a plurality of vertically extending posts 20, 20' spaced apart by a plurality of generally horizontally extending load supporting rails 22 defining a plurality of storage bins. As aforementioned the instant arrangement of warehousing system may be generally similar to that disclosed in the copending U.S. patent application Ser. No. 418,048, except that the storage frame arrangement in the instant application comprises various sizes of bins or storage means for storing various sizes of loads.

As can be seen best in FIGURES 1 and 2, each storage bay 12 and 14 may be divided into storage areas H, J, K and N with the storage means in, for instance area H defining columns of storage bins 19 all of generally the same size, for receiving therein generally correspondingly sized loads L (FIGURE 1) from the load carrier. The storage bins in area J are disposed in columns but with the bins 19a being of a greater height than the bins in storage area H but being of the same width, for receiving therein a greater height of load L' (FIGURE 1). The bins 19b in storage area K can be seen to be of the same height as the bins in storage area J but are of a greater width for receiving a corresponding size of load L″, while the bins 19c in storage area N have a greater height than the height of the bins in area K but in the example illustrated being of the same width as the bins in area K for receiving therein a load L‴. Accordingly, in the embodiment illustrated, each storage bay 12 and 14 comprises columns of stacked bins with there being four different sizes of bins in the four storage areas H, J, K and N, and adapted to receive therein a generally corresponding size of load from the load carrier.

While in the embodiment illustrated (and referring particularly to FIGURE 2) the storage bays 12 and 14 are shown as each having the same number of columns of storage bins with such columns of storage bins in the storage bays being disposed in confronting aligned relation in a direction transverse to the travel zone, it will be understood that sometimes in an installation, there could be existing plant structure, such as building posts, conveyor systems, and the like, which would interfere with installation of the storage bays. For instance, if in a particular installation the storage bays have to be located at building post locations resulting in a storage frame which surrounds one or more of the building posts of the enclosed building, of necessity the storage bin column or columns where the building posts are located are left empty since the space in the storage bin columns is occupied by the associated building posts. This results in a storage bin column in one storage bay which does not have a confronting storage bin column in the other storage bay.

In the embodiment illustrated, the smaller size of bins (i.e., 19) are disposed closest to the starting position of the load carrier, since for purposes of discussion in the embodiment illustrated, such smaller size bins are designated as requiring a higher in-and-out storage activity, as compared to the larger size bins disposed in areas J, K and N. Accordingly, the larger size bins 19a, 19b and 19c are disposed further from the starting position of the load carrier and preferably in the order corresponding to their expected storage activity. Such an arrangement provides a more expeditious system of storage means associated with the load carrier for more rapid retrieval and disposal of loads into the higher activity sections of the storage frame.

The aisle sides of the storage bays 12 and 14 may be provided with rails 24 providing tracks for supporting the load carrier 18 as it is moved therealong within the aisle or travel zone 16 of the system. Rails 24 extend outwardly of the aisle 16 at one end thereof, to enable the load carrier to be located in front of the storage bays 12 and 14 and at pickup and discharge stations 25, 25a (FIGURE 2) from which position the load carrier starts its movement into the travel zone to deposit loads into or pick up loads from the storage bays.

Such pickup and discharge stations in the embodiment illustrated are located on both sides of the load carrier, and are adapted to be disposed at a suitable height relative to the load carrier for loading different sizes of loads into the load carrier for depositing in the storage frame. Reference may be had to pending U.S. patent application Ser. No. 373,803, filed June 9, 1964, under the name of Anthony R. Chasar and entitled Automatic Warehousing System, for a more detailed disclosure of the construction of suitable pickup and discharge stations.

The load carrier 18 may comprise an upright mast structure formed with a pair of generally vertically extending track members 26 (FIGURES 1 and 2) with the mast structure being secured to an intermediate carriage frame 28. Carriage frame 28 may bridge the distance across the aisle 16 and may have wheels 30 at the sides thereof disposed in rolling engagement in the tracks 24 and supporting the load carrier on the tracks for horizontal movement. Such horizontally movable structure of the load carrier will be hereinafter referred to as conveyor mechanism or means 32. Suitable power means $k$ (FIGURE 1) such as an electric motor operably coupled to the wheels 30, may be provided for causing horizontal movement of the conveyor means 32.

The upper and lower ends of the mast structure of the conveyor mechanism 32 may be provided with frames 35, 35a, respectively, with generally horizontally rotatable rollers or pulleys 37 thereon (FIGURE 2) adapted for engagement with complemetary rails 38 mounted on the aisle side of each storage bay, thereby guiding the upper and lower ends of the load carrier 18 as it moved along the aisle 16, and providing in conjunction with carriage frame 28 and associated tracks 24 three point stabilizing engagement between the load carrier and the storage frame.

Load carrier 18 may also include a vertically movable elevator 40 adapted for movement along the vertical tracks 26 of the mast structure of the conveyor means 32, to substantially the full height of the storage frame. Suitable power means, such as an electric motor $s$ (FIGURE 1) may be provided in a known manner, for actuating the elevator in its vertical movement. From FIGURE 1 it will be seen that the elevator 40 is of suitable width for handling the various sizes of loads which are adapted for storage in the storage frame. The elevator 40 may mount a load supporting platform or extractor 44 (FIGURE 1) which preferably provides an extensible table, with such table being extendible in either of the opposed directions transverse to the direction of movement of the load carrier 18 in the traveling zone, so as to locate the extractor within either of the storage bays 12 or 14, effective to place the extensible table in position to deposit or remove a load from a selected one of the storage bins. Suitable power means, such as an electric motor 115, may be provided and operatively coupled to the extractor 44 for actuating the latter. Reference may be had to the aforementioned U.S. patent application Ser. No. 418,048 for a more detailed disclosure of such extensible extractor.

When depositing a load in one of the storage bins of the storage frame, the elevator 40 and associated extractor 44 is located opposite the selected bin opening such that as the load is moved into the selected storage bin, the upper surface of the extractor is slightly above the load supporting rail members 22 mounted on the sides of and defining the bottom extremity of the bin. When the load is completely within the confines of the bin, the elevator is lowered slightly to deposit the load onto the supporting rail members and permit retraction of the extractor back to its centered relationship with respect to the elevator.

Conversely, when it is desired to remove a load from a selected storage bin, the elevator is located such that the upper surface of the extractor 44 is extended into the bin slightly below the load. Thereafter the elevator 40 is raised so as to lift the load off the supporting rails 22, and then the extractor is retracted back to its centered condition with respect to the elevator.

The programmed operation of the load handling cycle for the load carrier may be controlled by an electrical control circuit as disclosed in the aforementioned copending U.S. patent application 418,048, but as modified as hereinafter set forth in the instant application, and more particularly as modified with the circuitry disclosed in FIGURES 6 through 8 of the instant application.

With the load carrier disposed at a pickup and discharge station 25, 25a located in the embodiment illustrated in front of the storage frame, the load carrier may be automatically moved into the aisle 16 and located opposite the selected storage bin or bins in the storage bays 12 and 14. At the selected bin during this control interval, the extractor may be actuated so that the load is deposited in or is withdrawn from the selected bin. The load carrier may be located sequentially opposite two storage bins in either of the storage bay sections 12 and 14 as described in U.S. patent application Ser. No. 418,048. For example, the load may be deposited in a bin at the first load handling position, and another load withdrawn from a bin at a second load handling position, and conveyed back to the pick-up and discharge station or stations. Reference may be had to the aforementioned U.S. patent application 418,048 for a detailed description of such control circuitry for programming the operation of the load carrier motors $k$, $s$ and 115.

Referring now to FIGURES 3 through 8, there is disclosed the circuitry which may be embodied in the circuitry illustrated in the aforementioned pending U.S. patent application 418,048, and more particularly in FIGURES 9C, 9E and 9F thereof, and in the locations illustrated in FIGURES 9 through 11 of the instant application.

As described in the aforementioned U.S. application 418,048, limit switch 7LS may be carried on the elevator 40 and is adopted to be operated by cams disposed on the mast 26 of the conveyor frame 32 of the load carrier, each time the elevator is raised to another bin level, and thus provide a vertical count sensor for the load carrier. Accordingly, during horizontal movement of the load carrier into the travel zone, the coils of the relays 2M-UP and 2M-Fast (FIGURES 10 and 11) are energized, whereby the vertical drive motor $s$ (FIGURE 1) is powered to move the elevator 40 upwardly along the conveyor mast. As the elevator passes each pair of horizontal rails 22 defining one of the bins in the storage bay, the limit switch 7LS is momentarily closed by the associated cam on the mast, to energize the coil of the stepping relay 2SRU and step its movable contact into successive engagement with the fixed contacts thereof. Thus each time the sensor switch 7LS is actuated, it indicates that the elevator has risen to the next bin level. The elevator continues to rise and the limit switch 7LS is again closed by the associated cam on the mast, defining the bottom of the selected bin in the storage bay, and as a result the relay 2SRU is momentarily energized to step its movable contact into engagement with a fixed contact thereof, whereupon the movable contacts of relays 2SRU and 2SRT match the actuated switch positions of the associated vertical switch bank, thereby resulting in the coil of the relay of the vertical switch bank being energized. As a result, relay 2M-Fast is de-energized and relay 2M-Slow is energized and thus the vertical drive motor $s$ is put into slow speed effective to raise the elevator slowly opposite the selected bin in the programmed area, until limit switch 11LS and switch 8LHS (assuming that a load is to be deposited) are actuated by the mast cams. The relays 2M-UP and 2M-Slow are then de-energized (FIGURES 10 and 11) thus stopping the elevator 40 opposite the opening of the selected bin.

Referring now to FIGURE 6 and particularly to the components in the phantom lined rectangle 50 thereof, it will be seen that in the present circuitry, there is provided an individual sensor switch 7LS for each area of the storage frame comprised of the same height of stacked storage bins. In other words, sensor switch 7LS (H) is provided for area H, 7LS (J and K) for areas J and K (where the storage bins are of the same height) and 7LS (N) is provided for storage area N. It will be seen from FIGURES 6 and 9 that one side of each such 7LS sensor switches is coupled to the line from the positive side of the rectifier in line 64 (FIGURE 9) while the other side of each 7LS switch is connected to manually operated switch means adapted for programming by the warehousing operator, to program the load carrier to the selected storage area (H, K, J or N) of the storage frame.

From FIGURE 6 it will be seen that limit switch 7LS (H) has four manually operated pushbutton type selector switches 1H, 2H, 3H and 4H coupled in parallel to said other side of switch 7LS (H), each of which selector switches corresponds to a column of the stacked storage bins in storage area H of either of the storage bays 12 and 14. Sensing switch 7LS (J and K) is connected to three manually operated parallel connected selector switches 5J, 6J and 7K, each of which selector switches corresponds to a respective column in storage areas J and K. Limit switch 7LS (N) is likewise coupled to manually operable selector switch 8N which corresponds to the storage bin column in area N.

It will be seen that if it is desired to program the load carrier to move for instance to the first storage column in area H of either storage bay, then selector switch 1H will be actuated by the operator for programming the movement of the load carrier, and as the elevator 40 of the load carrier moves vertically up to the selected storage bin level in the first column of the storage area H, the switch 7LS (H) as actuated by cams 7LS (H)' (FIGURE 4) will effectively count the bin levels and cause energization of relay 2SRU. If column 6 in storage area J is chosen for a load handling position, then selector switch 6J will be actuated, and so on. It will be seen that since the height of the storage bins in areas J and K are the same, the selector switches 5J, 6J and 7K can be coupled to the same sensor switch 7LS (J and K) since the latter will be actuated as determined by the position of the actuating lugs 7LS (J and K)' (FIGURE 4) on the mast of the load carrier, such position being the same for both areas due to the fact that the height of the bins in areas J and K are the same, and thus the levels of the load supporting rails 22 of such bins are the same.

Referring now to FIGURE 7, and particularly to the components within the phantom lined rectangle 54 thereof, it will be seen that in the present arrangement, there is provided one set of 8LS sensor switches for each storage area of the storage frame comprised of the same height of stacked storage bins. In other words, switches 8LSH (H) and 8LSL (H) are provided for area H; switches 8LSH (J and K) and 8LSL (J and K) are provided for areas J and K (wherein the storage bins are of the same height); and 8 LSH (N) and 8LSL (N) are provided for area N. Each of said sets of 8LS limit switches controls the vertical positioning of the elevator so that the extractor will move into the selected bin in either a high or low condition with respect to the load supporting rail members defining the lower extremity of the bin in the selected storage area, and depending on whether the load is being deposited into or removed from the selected bin, and as was previously discussed in connection with the extractor description. Accordingly, as the vertical drive motor is put into slow speed as aforedescribed and raises the elevator slowly opposite the selected bin in the selected column of the selected storage area, then limit switch 11LS (FIGURE 3) and one of the 8LS limit switches is actuated (either 8LSH or 8LSL depending on whether a load is being deposited or removed) and thus relays 2M-UP and 2M-Slow (line 39, FIGURE 1 and line 47, FIGURE 11, respectively) are de-energized thus stopping the elevator opposite the load receiving opening of the selected bin. Assuming, for instance, that the extractor 44 is adapted to deposit a load in the selected bin, then it is the 8LSH switch that is actuated as opposed to the 8LSL switch.

Associated with each of the pairs of aforementioned limit switches 8LSH and 8LSL are manually actuated switches adapted to be programmed by the warehousing operator to designate which area of the storage frame the load carrier is to move the load into or from the storage frame. For instance, sensor switches 8LSH (H) and 8LSL (H) have selector switches 1H', 2H', 3H' and 4H' coupled in parallel and to one side of sensor switches 8LSH (H) and 8LSL (H), while switches 8LSH (J and K) and 8LSL (J and K) have selector switches 5J', 6J' and 7K' coupled in parallel and to one side of sensor switches 8LSH (J and K) and 8LSL (J and K), while switches 8LSH (N) and 8LSL (N) have selector switch 8N' coupled to one side thereof. Each of the selector switches corresponds to a respective column in the respective storage area. In other words, selector switches 1H', 2H', 3H' and 4H' correspond to bin columns 1 through 4 of area H; selector switches 5J' and 6J' correspond to the fifth and sixth bin column in area J; selector switch 7K' corresponds to the bin column in area K, and selector switch 8N' corresponds to the bin column in area N. Thus it will be seen that the operator by actuation of the proper selector switch can determine which column of the selected storage area that the load carrier will be programmed for depositing or removing a load therefrom. For instance, assuming that it is column 1 of storage area H that the load carrier is desired to move to for a load handling position, then selector switch 1H' will be actuated by the operator and therefore coupling into circuit sensor switches 8LSH (H) and 8LSL (H) for actuation by the associated cam on the load carrier mast. The 7LS and 8LS switches for each of the storage areas may be of conventional lever type, spring return construction, well known in the switch art.

Referring now to FIGURE 8, and particularly to the components within the phantom lined rectangle 56 thereof, there is shown circuitry which is adapted for insertion into the main control circuitry of the warehousing system, and as illustrated in lines 49 to 50 of FIGURE 11 by the phantom lined rectangle 56. Such circuit arrangement is adapted to provide a safety check to assure that the extractor motions are within the programmed areas of the storage bays both for column location and bin level location. In the embodiment illustrated, such safety check circuit comprises multicontact limit switches 30LS, 31LS, 32LS and 33LS of conventional lever type, spring return design, mounted as for instance on the conveyor frame 32 of the load carrier, with such limit switches being adapted for respective actuation by actuators 60, 62, 64 and 66 (FIGURE 2) mounted, in the embodiment illustrated, on the vertical aisle posts 20 of the storage bays. Switches 30LS, 31LS, 32LS and 33LS may be conveniently mounted on lower frame 35a (FIGURES 1 and 2) of the load carrier and as illustrated in FIGURE 5. It will be seen that as the load carrier moves into the programmed area of the storage bay, that the actuator in such area will cause actuation of the respective limit switch 30LS, 31LS, 32LS or 33LS. The actuators 60, 62, 64 and 66 may be of elongated bar-like construction extending the full width of the respective storage area and in position to trip the respective detecting switch 30LS to 33LS. In the embodiment illustrated detecting switch 30LS may be actuated when the load carrier is in its starting position at the head end of the aisle, and as shown in FIGURE 8.

Switches 30LS, 31LS, 32LS and 33LS are mounted in parallel, and associated with each of such checking switches are selector switch means which are adapted to be actuated by the operator for programming the carrier, prior to its movement from its starting position into the travel zone for either depositing or picking up a load in the storage frame. For instance, as shown in FIGURE 8, switches 1H", 2H", 3H" and 4H" are coupled in parallel and to limit switch 30LS, while switches 5J" and 6J" are coupled in parallel and to one side of limit switch 31LS, and switches 7K" and 8N" are coupled to one side of respectively limit switch 32LS and limit switch 33LS. Each selector switch 1H", 2H", 3H" and 4H" corresponds to a respective column of stacked storage bins in storage area H of either storage bay. Selector switches 5J" and 6J" each corresponds to a respective column of storage bins in storage area J; and selector switches 7K" and 8N" correspond to the column of storage bins in respectively areas K and N in either storage bay. It will be seen therefore that actuation of a selected one of the selector switches in the checking circuit is not effective to complete the circuit until the respective checking limit switch 30LS, 31LS, 32LS or 33LS, is also actuated by its respective actuator mounted on the storage frame, thus providing a positive column check for insuring movement of the load carrier to the correct storage bin column in the selected area of the storage frame. For instance, if it is desired to program the load carrier for a load handling operation in the first column of storage area H, then selector switch 1H" will be actuated by the operator placing checking switch 30LS in circuit for actuation of the extractor when the elevator reaches the selected bin level in the first column of area H, and so on for the other storage areas.

Moreover, the other contact of each of the limit switches 30LS, 31LS, 32LS and 33LS is coupled to a respective set of contacts of the aforementioned 8LS limit switches. These 8LSH and 8LSL switch contacts, upon closing thereof, control the energization of the coils of relays 3MR and 3ML (FIGURE 11) effective to power the extractor drive motor 115, so as to extend the extractor into the selected bin. From FIGURE 8 it will be seen that there is provided one set of 8LSH and 8LSL contacts for each storage area comprised of the same height of stacked storage bins. In other words, contacts 8LSH (H)' and 8LSL (H)' are provided for area H; switch contacts 8LSH (J and K)' and 8LSL (J and K)' are provided for areas J and K (wherein the storage bins are of the same height), and switch contacts 8LSH (N)' and 8LSL (N)' are provided for area N. It will be seen that actuation of one of the 8LSH' or 8LSL' contacts by the respective cam on the load carrier mast is ineffective to place such contact in circuit, unless the respective checking switch (i.e., 30LS, 31LS, 32LS or 33LS) has been closed by its respective actuator.

Accordingly, such an arrangement as illustrated in FIGURE 8 provides a positive check both for the column and the bin level to assure that the load carrier motions are within the programmed areas only of the storage frame. It will be understood however, that the circuit shown in FIGURE 8 is not needed for normal operation of the warehousing system and serves only as a check against possible malfunctioning of the positioning circuits. While limit switches have been illustrated and described for the checking circuit, trolley conductors and collector shoes could be used instead of such limit switches to provide the same end result.

Programming of the load carrier for handling a load may be accomplished as described in the aforementioned U.S. patent application Ser. No. 418,048, and for instance as commencing on page 16 of the specification thereof, and thus will not be duplicated here. The additional programming needed for selecting the proper storage area for a particular size of load consists of merely depressing or actuating the proper pushbutton selector switches in the FIGURES 6, 7 and 8 circuits, which correspond to the selected column of storage bins in the selected storage area where the load handling operation or operations are to occur in the storage frame, and as aforedescribed in connection with FIGURES 6, 7 and 8, so that the size of the load on the load carrier is matched to the bin size to which the load carrier is adapted to move. In this connection it will be understood of course that the load carrier may be programmed for only a single operation rather than being programmed with two commands, and by not actuating the controls (e.g., 50 FIGURE 11) for moving the load carrier to its second command position, whereupon the load carrier will merely move to its first command position and return to the pickup and discharge station. In actual practice the selector switches for each column of storage bins in each storage area in the FIGURES 6, 7 and 8 circuits would preferably be actuated by a single pushbutton switch or other control, to obviate the necessity of actuating three of the selector switches for each load handling position. In other words, if a load handling position in column one of storage area H was selected, the actuation of a single push button would cause simultaneous actuation of selector switches 1H, 1H', and 1H" in FIGURES 6, 7 and 8 respectively.

Referring now to FIGURES 12 to 16, inclusive, there is disclosed a means for sensing the width of a load on the load carrier and if said sensing means determines that the load is oversized for the width of the storage bins in the programed area of the storage frame, the load carrier is rendered inoperative so that it can not move in its cycle for inserting a load into the storage frame if the load carrier is at the pick-up and discharge station, or the load carrier is automatically returned to the pickup and discharge station if the load carrier is already in its operating cycle and picks up an oversized load. In other words, if the load placed on the load carrier at the pickup and discharge station, is determined by the sensing means to be oversize for the width of bins in the programed storage area, the load carrier is prevented from commencing its operating cycle to deposit the load in the storage frame. Moreover, if the load carrier has been programed to move into the storage frame area and pick up a load therein and transport it for storage into another area of the storage frame, and the sensing means determines that the picked up load is oversize for the width of the bins in the storage area wherein the load is to be deposited, the load carrier is prevented from attempting to insert the oversized load into the selected storage area, and the load carrier is automatically returned to the pickup and discharge station with the oversized load. Such an arrangement prevents damage to the loads and/or the storage frame in the event of operator error in programing a selected width of load for a lesser width of storage bin.

In FIGURES 12 and 13, there is disclosed circuitry which may be embodied in the circuitry illustrated in the aforementioned pending United States patent application Ser. No. 418,048 and more particularly in FIGURE 9B thereof, and in the locations illustrated by phantomed lined rectangles 80 and 82 in FIGURE 14 of the instant application. Such sensing means, in the embodiment illustrated, comprises photoelectric scanners disposed in predetermined positions on opposite sides of the load supporting extractor 44 of the load carrier, for sensing the width of the load on the extractor.

Referring now to FIGURES 15 and 16 there is shown respectively a top plan and a side elevational view of the load carrier and more particularly the elevator and associated extractor of the load carrier. As aforementioned, the sensing means which senses the width of the load on the extractor may comprise pairs of photoelectric cells 1PE, 2PE, preferably adjustably mounted on support 84 on the elevator 40. One cell of each pair may be mounted so as to scan an associated side of a load centered on the extractor. A light source 1L, 2L may be adjustably mounted adjacent the respective photoelectric cell, and is adapted to project a beam of light in a generally vertical direction downwardly toward the horizontal plane of the extractor 44. Mounted on the elevator in the path of the light beam from each of the light sources may be light reflecting targets or markers 1RT, 2RT. Such reflective markers may be formed of any suitable material, such as for instance Scotch-Lite sheeting manufactured by Minnesota Mining and Manufacturing Company, and are adapted to reflect the light from the light source back to the respective photoelectric cell, to cause it to be energized. So long as the light beam from each of the light sources associated with each of the photoelectric cells is uninterrupted, the relay associated with each of the photoelectric cells maintains the relay contacts 1PER and 2PER (FIGURES 12 and 13) closed. It will be seen that sensors 1PE are adapted to sense the widths of loads L and L' while sensors 2PE are adapted to sense the width of loads L" and L'''.

As can be seen from FIGURES 12 and 14, photoelectric relay contacts 1PER may be located in line 10 of the control circuit intermediate limit switch 9LS and the "cycle start" control 52. Coupled to one side of the photoelectric relay contacts 1PER, in parallel, are manually operated pushbutton type selector switches 1H''', 2H''', 3H''', 4H''', 5J''' and 6J'''. Each of such selector switches corresponds to a respective column of the stacked storage bins in storage areas H and J (FIGURE 2) of either of the storage bays 12 and 14. It will be understood that the reason that the selector switches for areas H and J can be coupled to the same set of photoelectric relay contacts is that the width of the bins in both areas H and J of the storage frames (in the embodiment illustrated) are the same, and therefore the same width of load can be programed into either storage area H or J.

Coupled to one side of photoelectric relay contacts 2PER are manually operated pushbutton type selector switches 7K''' and 8N''', the latter being coupled in parallel. Each of the selector switches 7K''' and 8N''' corresponds to a column of the stacked storage bins in respectively storage areas K and N (FIGURE 2) of either of the storage bays 12 and 14, and it will be seen that the width of the storage bins in areas K and N are equal. The other side of the selector switches are coupled back into line 10 in circuit with the cycle start button 52.

It will be seen that if, for instance, the load carrier is programed by the operator to move from its starting position at the pickup and discharge station to the first storage column in area H of either storage bay 12 or 14, then selector switch 1H''' will be actuated by the operator for programing the movement of the load carrier. However, if the load on the extractor is of such size that it extends outwardly on either side of the extractor beyond or into the beam of light from any of the light sources so as to cutoff the beam of light to any of reflector targets 1RT or 2RT, then the photoelectric relays of contacts 2PER and/or 1PER will be deenergized and the relay contacts 2PER and/or 1PER will open, thereby opening the circuit to the cycle start button 52, and thus prevent movement of the load carrier from the pickup and discharge station. Accordingly, the load carrier is rendered inoperative irrespective of initiation of the operating cycle by the operator, due to the fact that the load on the extractor is too wide for the width of the bin to which the load carrier has been programed for movement.

Conversely, it will be seen that if the load does not extend into interferring relationship with respect to the light beams directed toward the reflective targets 1RT and thus the photoelectric contacts 1PER are maintained in closed condition, then actuation of the selector buttons 1H''' will complete the circuit to the cycle start button, and cause actuation of the load carrier from the pickup and discharge stations 25, 25a, in the commencement of the operating cycle for the load carrier.

Since operation of the load carrier in its operating cycle is fully disclosed in the aforementioned copending United States patent application Ser. No. 418,048, and as for instance commencing on page 16 thereof as aforediscussed, it will not be repeated here and reference may be had to such copending patent application for a discussion of operator programing for movement of the load carrier in its operating cycles.

Now assuming for instance that the load carrier has been programed to move into the travel zone 16 from the pickup and discharge station and to first pick up a load at a particular storage bin rather than first depositing a load, and then to take the picked-up load and move it to a different bin in the storage area, it will be seen that since there is no load initially on the extractor of the load carrier at the pickup and discharge station that the photoelectric relay contacts 1PER and 2PER are maintained closed, and thus the circuit will be completed to the cycle start button 52 upon actuation by the operator of the selected of the selector buttons 1H''' through 8N'''. Accordingly, it will be seen that the load extractor will pick up a load at the selected bin in the selected storage area and will move it into centered relationship with respect to the elevator as the extractor 44 moves back to its centered position with respect to the elevator. In the event of operator error, it may be that at this time, the picked-up load is of a greater width than the width of the bins in the storage area to which the load carrier has been programed to redeposit the picked-up load in a new location in the storage frame.

Referring now to FIGURE 13 and particularly to the components within phantom line rectangle 82 thereof, there is shown circuitry which is adapted for insertion into the main control circuitry of the warehousing system, and as illustrated in line 14 of FIGURE 14 by the phantom line rectangle 82. Such a circuit arrangement is adapted to cause interruption of the load carrier cycle in its operation of inserting a picked-up load on the extractor into a new position in the storage frame, and to automatically return such load carrier and associated load to the pickup and discharge station in the event that such picked-up load is oversize for the width of the bins in the selected new position storage area of the storage frame.

Such circuit may comprise the switch contacts 30LS, 31LS, 32LS and 33LS (FIGURE 13, line 14) of aforementioned multicontact limit switches 30LS, 31LS, 32LS and 33LS of the safety check circuit arrangement (FIGURES 2 and 8). As shown in FIGURE 2, such limit switches, as aforediscussed, are adapted for respective actuation by actuators 60, 62, 64 and 66 (FIGURE 2) mounted on the vertical aisle posts 20 of the storage bays. In FIGURE 13, switch contact 30LS is a normally open contact while the other contacts 31LS, 32LS and 33LS are normally closed contacts. The photoelectric relay contacts 1PER and 2PER are coupled in parallel to the limit switch contacts 30LS to 33LS and as shown. It will be understood that switch contact 30LS in FIGURE 13 is open since switch contacts 30LS in FIGURE 8 are normally closed when the load carrier is in its starting position at the pickup and discharge station.

Assume for instance that a load has been picked-up at a first storage area (e.g. K) in the operating cycle and the load carrier has been programed to deposit the picked-up load in storage area H of the storage frame. Thus, due to operator error, such picked-up load would be of a width which would not fit into the bins of storage area H. The picked-up load would interrupt the light beams to reflector targets 1RT and would cause opening of the photoelectric relay contacts 1PER. As the load carrier moved in the travel zone 16 and up to the programed bin in storage area H, it will be seen that due to the open condition of the photoelectric relay contacts 1PER (FIGURE 13) that as the load carrier moves into the storage area H, switch contact 30LS (FIGURE 13, line 14) will be open and the photoelectric relay contacts 1PER will also be open due to the interruption of the light beam onto the reflector targets 1RT by the oversized load from storage area K. Thus relay 4CR (line 10, FIGURE 14) and relay 2TR (line 16, FIGURE 14) and relay 5CR (line 18, FIGURE 14) are deenergized. Accordingly, relay contact 5CR (line 56, FIGURE 11) is open and relay 10CR (line 56, FIGURE 11) is deenergized.

Therefore, when the elevator 40 is positioned at the selected bin in the selected storage area H and with the selected bay switch of the second command switch bank 59 (line 22, FIGURE 10) closed, the relay 2TR cannot be energized and contact 2TR (line 49, FIGURE 11) remains open, and thus neither of the extractor motor relays 3MR or 3ML (FIGURE 11) are energized, and accordingly the extractor drive motor 115 is not energized. Accordingly, the extractor 44 is not extended into the selected bin in area H. Since the extractor 44 is in centered position with respect to the elevator, the 13LS switch contact (line 20, FIGURE 14) is closed thus energizing relay coil 3TR (line 57, FIGURE 11). When relay 3TR, which is a conventional time delay relay, times out, the 3TR contact (line 58, FIGURE 11) closes to energize relay coil 12CR. Thus relay 1M Reverse (line 26, FIGURE 10) relay 1M Fast (line 27, FIGURE 10) 2M Down (line 44, FIGURE 11) and 2M Fast (line 45, FIGURE 11) are thus energized. Accordingly, the horizontal and vertical drive motors $k$ and $s$ of the load carrier are energized to move the load carrier including the elevator and associated extractor in fast speed toward the pickup and discharge station. The load carrier moves along the travel zone until it trips the limit switch 4LS (line 29, FIGURE 10) near the load and discharge station whereby the relay 1M Fast is deenergized and relay 1M Slow (line 31, FIGURE 10) and relay 8CR (line 34, FIGURE 10) are energized. The horizontal drive motor $k$ is put into low speed and continues to return the conveyor until the limit switch 4LS is released. At this instant, relay 1M Slow is deenergized and relay 1TR (line 36, FIGURE 10) is energized. The conveyor continues to coast until it trips limit switch 5LS closing its contact (line 10, FIGURE 14) and opening its contact (line 26, FIGURE 10). The relays 1M Reverse, 8CR and 1TR are thus deenergized, whereby the load carrier stops at the pickup and discharge station as illustrated for instance in FIGURES 1 and 2. It will be seen therefore that the circuitry illustrated in FIGURE 13 prevents the insertion of a too wide load into a narrower width storage bin during movement of the load carrier in its operating cycle, in the event of programing error on the part of the operator, and automatically returns the oversized load to the pickup and discharge station for correction by the operator.

On the other hand, if the operating cycle has been correctly programed such that, for instance, a load is removed from one of the bins in area H for redeposit in area J, when the load is picked up at the selected first command position of the load carrier in its operating cycle, the photoelectric relay contacts 1PER (line 14, FIGURE 13) will remain closed due to the noninterruption of the light beams from light sources 1L as the carrier moves to its second command position in the operating cycle, or in other words to a selected bin in area J of the storage frame, and with the picked-up load. Limit switch contact 31LS (line 14, FIGURE 13) will open due to the actuation of the limit switch 31LS by actuator 62 (FIGURE 2) but due to the closed condition of the photoelectric contacts 1PER, relay coil 10CR (line 56, FIGURE 11) is energized thus permitting energization of relay coil 1CRL or relay coil 1CRU and energizing relay 3MR or relay 3ML effective to power the extractor drive motor 115 and extend the extractor into the selected bin in the selected storage bay in area J. Since the load was taken from area H and thus is of a width receivable in the bins of area J, the load is deposited after which the extractor moves back into centered relationship with respect to the elevator and relay coil 12CR is energized to return the load carrier to the pickup and discharge station as aforedescribed, but minus its load.

If the load carrier has been programed for a single command operation, and for instance programed to insert a load in a selected bin and then to return to the pickup and discharge station, and because of machine error due to malfunctioning of the circuitry, the load carrier moves from the pickup and discharge station toward the selected bin in the selected storage area to deposit the load therein even though the load is oversize for the width of bin selected, the aforedescribed circuitry will operate to prevent insertion of the load into the selected bin and will return the oversize load to the pickup and discharge station in the same manner as the two-command cycle aforedescribed, except that relay 10CR remains deenergized since the second command control switch 50 (line 55, FIGURE 11) is maintained in off condition.

In the United States Patent No. 3,219,207, issued Nov. 23, 1965, to Anthony R. Chasar, there is disclosed circuitry for use in an automatic storage apparatus for sensing the height of a load and preventing a high load from being attempted to be stored in a support means or bin which has been designated for the support of a relatively lesser height of load. Such a system could be readily embodied into the present system by relating the multiple load heights as determined by the photo cells (e.g., 92, 93, 94, 92′, 93′, 94′) and related limit switches of the circuitry of Patent 3,219,207 to the respective storage zones H, J, K and N as determined by the limit switches 30LS, 31LS, 32LS and 33LS respectively of the instant application.

From the foregoing discussion and accompanying drawings it will be seen that the invention provides a novel automatic warehousing system for handling varied sizes of loads into and from the storage frame of the system with the storage frame being comprised of columns of varied size storage means or bins disposed in predetermined areas of the storage frame, and wherein means are provided for controlling the movement of the load carrier for inserting and/or withdrawing a load from the storage frame, and with selector means for selecting to which of the areas of the storage frame that the load carrier will move upon actuation thereof, for proper load handling at the selected column and bin level in the selected area of the storage frame. The invention also provides protection for the system in the event of programing error on the part of the operator in attempting to place a wide load in a narrower storage bin opening.

What is claimed is:

1. In an automatic warehousing system for handling various sizes of loads into and from at least one storage bay, said storage bay providing columns of stacked storage means, with said storage bay by comprising at least one storage area wherein at least one of said columns is comprised of storage means of a different size for receiving therein a corresponding size of load, and as compared to the size of the storage means in the remainder of the storage area of said storage bay, said system including a load carrier movable in a travel zone alongside said storage bay for delivering a load to or returning a load from said storage means at selected load handling positions, said load carrier comprising a generally horizontally movable conveyor section, an elevator section mounted for vertical movement on said conveyor section, and a laterally movable extractor section mounted on said elevator section and adapted for movement into and retraction from selected storage means, electrical control means for automatically controlling the movement of said load carrier through a load handling cycle in said storage bay, said control means including power means for actuating said load carrier, circuit means connected to said power means, sensor means in said circuit means providing location determining means for said conveyor section and location determining means for said elevator section to control the positioning of the latter and operation of said extractor section, each of said storage areas having respective location determining means provided therefor and coacting therewith, and area selecting means in said circuit means coacting with each of said respective location determining means for selecting to which of said areas of said storage bay that said load carrier conveyor section and elevator section will move upon actuation of said load carrier and placing the respective location determining means in circuit for positioning of said elevator section and operation of said extractor section in the selected storage area.

2. A system in accordance with claim 1 wherein said load carrier is movable from a starting position adjacent one end of said travel zone for movement into the latter for depositing a load into or removing a load from said storage means, at least one of said storage areas of said storage bay being adapted to store loads requiring a higher in-and-out storage activity than the other storage areas of said storage bay, the last-mentioned one storage area being located in said storage bay closer to said starting position of said load carrier than the other storage areas in said storage bay.

3. A system in accordance with claim 1 wherein each of said columns of said storage means comprises storage bins disposed in stacked relation, said bins in said one storage area being of a different height than the height of the bins in other storage areas of said storage bay.

4. A system in accordance with claim 3 wherein the storage bins in said one storage area are of a different width than the storage bins in said other storage areas of said storage bay.

5. A system in accordance with claim 1 wherein said area selecting means includes switch means for each column of storage means, said switch means being selectively actuatable to define the load handling position in said storage bay to which said load carrier will move.

6. A system in accordance with claim 1 wherein said location determining means for said conveyor section includes checking control means in said circuit means operable to insure that said extraction section of said load carrier can move for depositing or retrieving a load only in the selected area of said storage bay.

7. A system in accordance with claim 6 wherein said checking control means includes switch means corresponding to each of said storage areas and means in each storage area for actuating the respective of the last mentioned switch means when said load carrier is disposed adjacent the selected storage area of said storage bay.

8. A system in accordance with claim 1 wherein said location determining means for said elevator section are responsive to movement of said elevator section and operable to provide a signal each time said elevator section moves to a storage means in said storage bay, said last mentioned location determining means being effective to de-energize said power means and stop said elevator section at the selected storage means, there being separate area selecting means for each of said columns in each storage area, said column selecting means for each storage area being coupled in parallel with one another and coupled in circuit with the respective of said location determining means, the actuated column selecting means being effective to place the respective of said location determining means in condition for predetermined de-energization of said power means and stopping of the elevator section of the load carrier at the selected of said storage means in the selected storage area and causing energization of said extractor section, for inserting a load into or removing a load from the selected storage means.

9. A system in accordance with claim 8 wherein the location determining means for said conveyor section includes checking control means in said circuit means operable to insure that said extractor section of said load carrier can move for depositing or retrieving a load only in the selected storage area of said storage bay, said checking control means including separate location determining means for each of said storage areas, each of the last mentioned location determining means being adapted to be placed in conducting condition upon movement of said conveyor section of said load carrier adjacent the respective storage area of said storage bay, each of said last mentioned location determining means comprising a switch and means for actuating the last mentioned switch when said load carrier is disposed adjacent the selected storage area of said storage bay.

10. A system in accordance with claim 1 wherein said location determining means includes switch means carried by said elevator section and actuating means carried by said conveyor section and adapted for coaction with said switch means for actuation of the latter upon predetermined vertical movement of said elevator section with respect to said conveyor section, and wherein said conveyor section extends for substantially the full height of said storage bay, said actuating means comprising groups of laterally spaced cams on said conveyor section spaced vertically therealong, each of said storage areas having cams on said conveyor section designating the levels of the storage means in the respective storage areas, said cams for each of said storage areas being at generally different levels with respect to ground level and corresponding to the height of the individual storage means in the respective storage area.

11. An automatic warehousing system in accordance with claim 1 including other sensing means on said load carrier responsive to a load exceeding a predetermined size of storage means, and means in said circuit means responsive to said other sensing means for deactivating said load carrier.

12. An automatic warehousing system in accordance with claim 1 including other sensing means on said load carrier responsive to a load exceeding a predetermined size of selected storage means, and means in said circuit means responsive to said other sensing means for deactivating said extractor section to thus prevent transferring of the load from the load carrier to said selected storage means.

13. An automatic warehousing system in accordance with claim 11 wherein there is provided respective other sensing means for each storage area having different size of storage means and wherein said area selecting means includes contact means in circuit with said means responsive to said other sensing means.

14. An automatic warehousing system in accordance with claim 11 including a pickup and discharge station from which said load carrier is adapted to commence its movement in said load handling cycle, said means responsive to said other sensing means including means for deactivating said load carrier to prevent initiation of movement of said load carrier in said cycle and thus prevent movement of said load carrier away from said pickup and discharge station with the load.

15. An automatic warehousing system in accordance with claim 12 including a pickup and discharge station from which said load carrier is adapted to commence its movement in said load handling cycle, and means in said circuit means for causing said load carrier to return to said pick-up and discharge station upon said deactivation of said extractor section when said load carrier is in said cycle.

References Cited

UNITED STATES PATENTS

| | | |
|---|---|---|
| 2,691,448 | 10/1954 | Lontz. |
| 2,941,738 | 6/1960 | Burke et al. |
| 2,988,237 | 6/1961 | Devol. |
| 3,139,994 | 7/1964 | Chasar. |
| 3,219,207 | 11/1965 | Chasar. |
| 3,297,379 | 1/1967 | Artaud. |
| 3,313,427 | 4/1967 | Inuzuka _____ 214—16.1 |

FOREIGN PATENTS

| | | |
|---|---|---|
| 1,163,584 | 2/1964 | Germany. |
| 158,669 | 10/1963 | Russia. |

GERALD M. FORLENZA, Primary Examiner

R. B. JOHNSON, Assistant Examiner